(12) United States Patent
Moritomo

(10) Patent No.: US 9,678,699 B2
(45) Date of Patent: Jun. 13, 2017

(54) COMMUNICATION APPARATUS AND METHOD OF CONTROLLING THE SAME

(71) Applicant: CANON KABUSHIKI KAISHA, Tokyo (JP)

(72) Inventor: Kazuo Moritomo, Kawasaki-shi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/709,734

(22) Filed: May 12, 2015

(65) Prior Publication Data

US 2015/0331650 A1 Nov. 19, 2015

(30) Foreign Application Priority Data

May 16, 2014 (JP) ................. 2014-102726

(51) Int. Cl.
 *G06F 3/12* (2006.01)
 *H04N 1/00* (2006.01)
 *H04W 4/00* (2009.01)

(52) U.S. Cl.
 CPC .......... *G06F 3/1292* (2013.01); *G06F 3/1222* (2013.01); *G06F 3/1236* (2013.01); *H04N 1/00* (2013.01); *H04N 1/00137* (2013.01); *H04N 1/00188* (2013.01); *H04N 1/00251* (2013.01); *H04W 4/008* (2013.01)

(58) Field of Classification Search
 CPC .... G06F 3/1292; G06F 3/1222; G06F 3/1236; H04N 1/00137; H04N 1/00188; H04N 1/00251; H04N 1/00; H04W 4/008
 See application file for complete search history.

(56) References Cited

U.S. PATENT DOCUMENTS

| 2002/0059482 A1* | 5/2002 | Ashizaki | G06F 3/1204 710/5 |
| 2005/0190401 A1* | 9/2005 | Ito | G06F 3/1211 358/1.15 |
| 2011/0209211 A1* | 8/2011 | Kuindersma | H04L 67/16 726/12 |
| 2015/0020150 A1* | 1/2015 | Hagiuda | H04N 1/44 726/1 |
| 2015/0248263 A1* | 9/2015 | Hattori | G06F 3/1204 358/1.15 |

FOREIGN PATENT DOCUMENTS

JP 2011035768 A 2/2011

* cited by examiner

*Primary Examiner* — Iriana Cruz
(74) *Attorney, Agent, or Firm* — Rossi, Kimms & McDowell LLP

(57) ABSTRACT

A communication apparatus performs wireless connection processing for performing wireless communication with another communication apparatus, specifies a service that is to be executed along with the other communication apparatus, in the wireless connection processing, using wireless communication that is based on the wireless connection processing, and performs port control such that a port necessary for execution of the specified service is opened, and a port not necessary for execution of the service is locked.

9 Claims, 8 Drawing Sheets

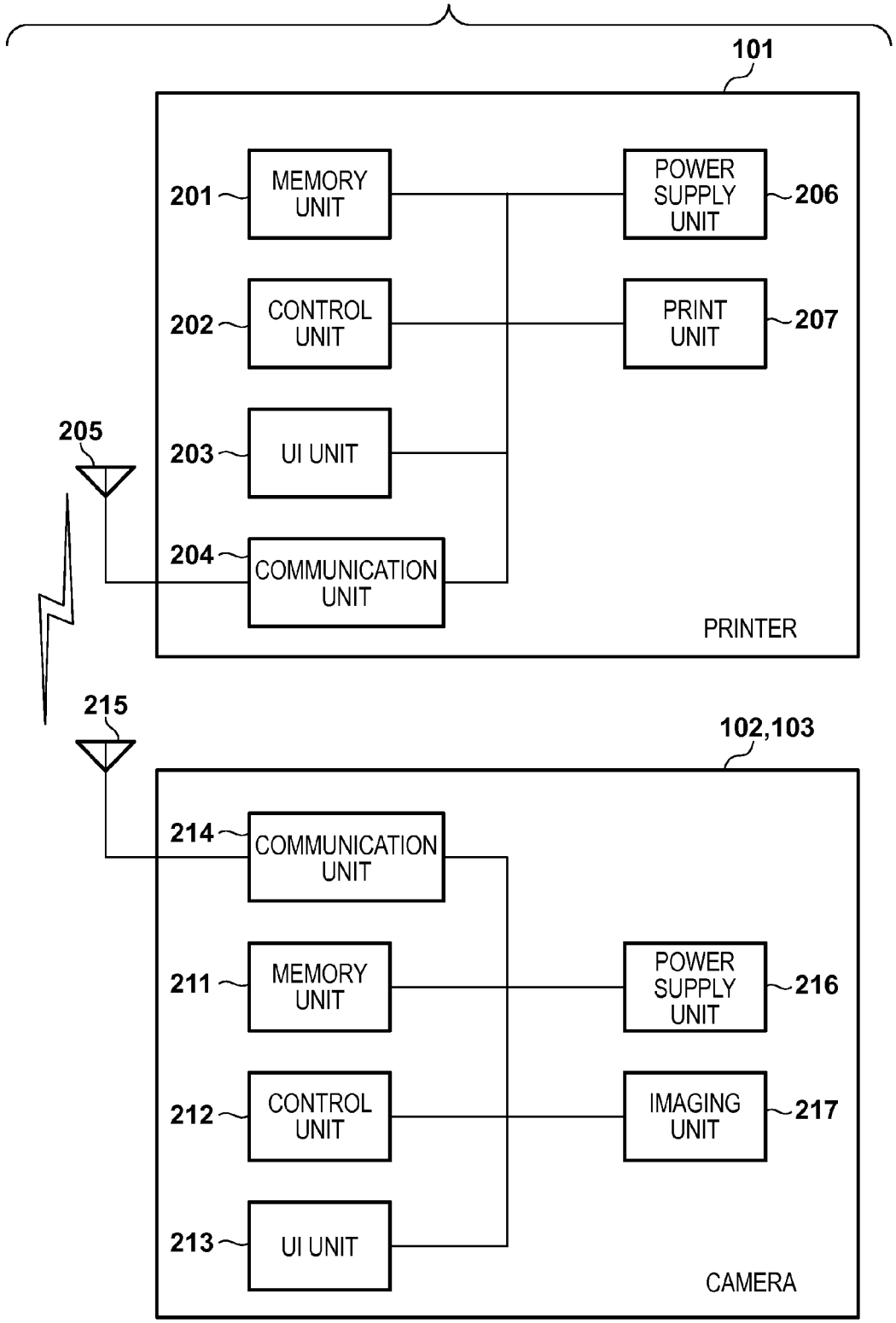

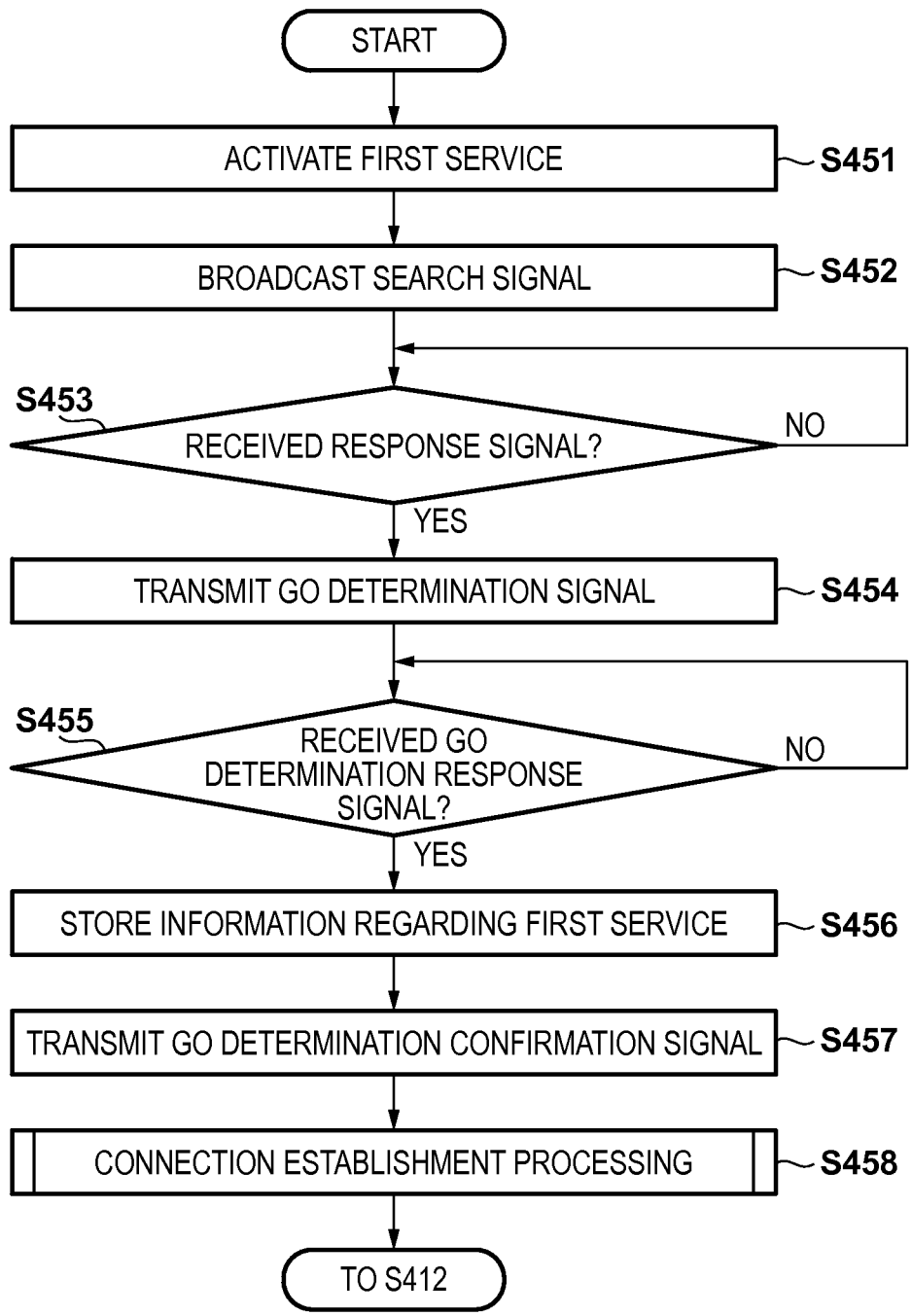

FIG. 5A

| APPARATUS | FIRST PREDETERMINED SERVICE |
|---|---|
| CAMERA 102 | CAN PROVIDE |
| CAMERA 103 | CANNOT PROVIDE |

FIG. 5B

| PORT | LOCK STATE |
|---|---|
| xxx | LOCKED |
| yyy | LOCKED |
| zzz | LOCKED |

FIG. 5C

| PORT | LOCK STATE |
|---|---|
| xxx | UNLOCKED |
| yyy | LOCKED |
| zzz | LOCKED |

FIG. 5D

| PORT | LOCK STATE |
|---|---|
| xxx | UNLOCKED |
| yyy | UNLOCKED |
| zzz | UNLOCKED |

COMMUNICATION APPARATUS AND METHOD OF CONTROLLING THE SAME

BACKGROUND OF THE INVENTION

Field of the Invention

The present invention relates to a communication apparatus and a method of controlling the same.

Description of the Related Art

In recent years, wireless LAN devices have been able to communicate with each other via wireless access points, and the Wi-Fi Alliance has developed the Wi-Fi Direct (registered trademark) standard as a standard for direct communication between wireless LAN devices (Japanese Patent Laid-Open No. 2011-35768). The Wi-Fi Direct standard defines a function for advertising and searching for service information supported by high level applications (service discovery function) as an optional function. Using the service discovery function, service information held by an electronic device that is to be a communication destination can be obtained before executing connection processing, and when service information has been obtained, it is possible to also obtain port information indicating the port that is to be used by the service, and communication can be performed using that port.

However, if the communication partner apparatus does not have the service discovery function, it is not possible to obtain port information indicating the port that is to be used by the service provided by the communication partner apparatus, and therefore communication cannot be performed using that port, and there is a risk of a decrease in user convenience. On the other hand, if all of the ports are opened, there is a possibility of a connection being established by an unintended apparatus, which leads to a decreased level of security.

SUMMARY OF THE INVENTION

One embodiment of the present invention provides a communication apparatus that raises the level of security while maintaining connectability, as well as a method of controlling the same, and a program.

According to one aspect of the present invention, there is provided a communication apparatus comprising: a connection unit configured to perform wireless connection processing for performing wireless communication with another communication apparatus; a specifying unit configured to specify a service that is to be executed along with the other communication apparatus, in the wireless connection processing performed by the connection unit, using wireless communication that is based on the wireless connection processing; and a control unit configured to perform port control such that a port necessary for execution of the service specified by the specifying unit is opened, and a port not necessary for execution of the service is locked.

Also, another aspect of the present invention, there is provided a method of controlling a communication apparatus, comprising: a connection step of performing wireless connection processing for performing wireless communication with another communication apparatus; a specifying step of specifying a service that is to be executed along with the other communication apparatus, in the wireless connection processing performed in the connection step, using wireless communication that is based on the wireless connection processing; and a control step of performing port control such that a port necessary for execution of the service specified in the specifying step is opened, and a port not necessary for execution of the service is locked.

Further features of the present invention will become apparent from the following description of exemplary embodiments with reference to the attached drawings.

BRIEF DESCRIPTION OF THE DRAWINGS

FIG. 2 is a block diagram showing an example of hardware configurations of a printer and cameras according to the embodiment.

FIG. 4B is a flowchart of processing performed by the cameras according to the embodiment.

FIGS. 5A to 5D are diagrams showing information stored by a memory unit 201.

DESCRIPTION OF THE EMBODIMENTS

Figure 1:
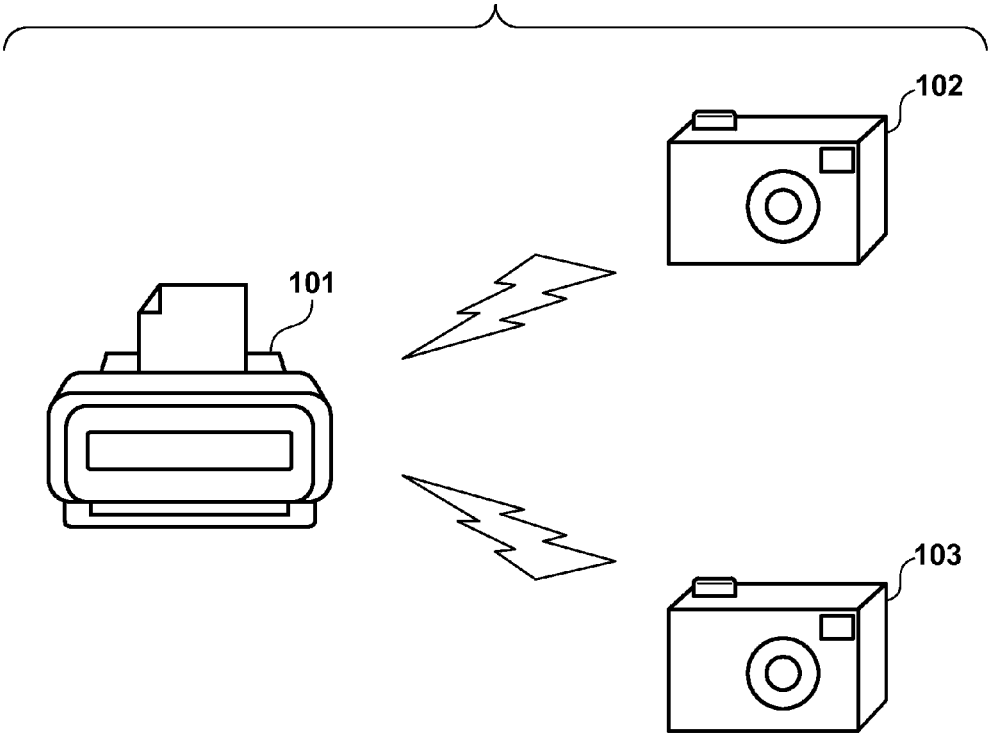
FIG. 1 is a diagram showing an example of a network configuration according to an embodiment.

FIG. 1 is a diagram showing an example of the network configuration of a communication system according to the present embodiment. A printer 101 is one example of a communication apparatus that includes a communication function, and the printer 101 provides a print function and performs communication compliant with the IEEE 802.11 series, for example. A camera 102 and a camera 103 are examples of other communication apparatus that include a communication function, and these cameras 102 and 103 perform communication compliant with the IEEE 802.11 series, for example, with the printer 101. Note that the "communication apparatus" and "other communication apparatuses" referred to here are not limited to the printer 101 and the cameras 102 and 103, and may be storage devices, mobile phones (including smartphones), PCs, medical devices, and the like. It should also be noted that the camera 102 can provide a later-described first service, and the camera 103 does not provide the first service.

FIG. 2 is a block diagram showing an example of the hardware configurations of the printer 101 and the cameras 102 and 103. Note that in the printer 101 and the cameras 102 and 103, multiple blocks shown in FIG. 2 may be realized as a single module, and single blocks shown in FIG. 2 may be realized by multiple modules.

First, the configuration of the printer 101 will be described. A memory unit 201 is configured by a memory (not shown) such as a read-only ROM or a rewritable RAM. The memory unit 201 stores programs (including an OS) for the execution of various later-described operations by a control unit 202, image data, communication parameters, and various types of information such as port information. Note that besides a memory such as a ROM or a RAM, the memory unit 201 can be a storage medium such as a flexible disk, a hard disk, an optical disk, a magnetic optical disk, a CD-ROM, a CD-R, a magnetic tape, a non-volatile memory, or a DVD.

The control unit 202 includes a CPU, an MPU, or a computer, and the control unit 202 realizes various types of control in the printer 101 by reading out and executing programs stored in the memory unit 201. Note that the control unit 202 may be provided with an OS (Operating System) and perform overall control of the printer 101 through coordination between the OS and the above-mentioned programs. A user interface unit (hereinafter, "UI unit") 203 causes a display device (not shown) to display various types of information from the control unit 202, the communication unit 204, and the memory unit 201. The UI unit 203 also provides the control unit 202 with signals corresponding to various types of operations performed by a user.

A communication unit 204 performs communication compliant with the IEEE 802.11 series, for example, via an antenna 205, and specifically receives signals and information from external apparatuses and transmits information and signals from the printer 101 to external apparatuses. A power supply unit 206 supplies electrical power to the hardware modules shown in FIG. 2. Note that although the power supply unit 206 obtains electrical power for supply from a commercial power source in this case, there is no limitation to this, and a configuration having an internal battery is possible. A print unit 207 outputs image data stored in the memory unit 201 by printing. Note that image data received from the camera 102 and the camera 103, which are external apparatuses, via the communication unit 204 can be temporarily stored in the memory unit 201 and output by the print unit 207.

Next, the configurations of the cameras 102 and 103 will be described. A memory unit 211, a control unit 212, a communication unit 214, and an antenna 215 have configurations similar to the memory unit 201, the control unit 202, the communication unit 204, and the antenna 205 of the printer 101. Note that control unit 212 performs various types of control for the cameras 102 and 103. Also, a UI unit 213 provides the control unit 212 with signals corresponding to various types of operations performed by a user, such as a shooting operation and an image transmission operation. A power supply unit 216 supplies electrical power to the hardware modules in the cameras 102 and 103. Note that the power supply unit 216 is normally an internal battery that can be repeatedly used through charging. An imaging unit 217 converts a signal obtained by an image pickup device into a digital signal, and supplies the digital signal to the control unit 212. The control unit 212 converts the signal obtained from the imaging unit 217 into an image, and stores the image in the memory unit 211 as image data. The communication unit 204 of the printer 101 and the communication units 214 of the cameras 102 and 103 can communicate with each other by wireless communication, and can carry out wireless LAN communication compliant with the IEEE 802.11 series, for example, as previously described.

Figure 3A:
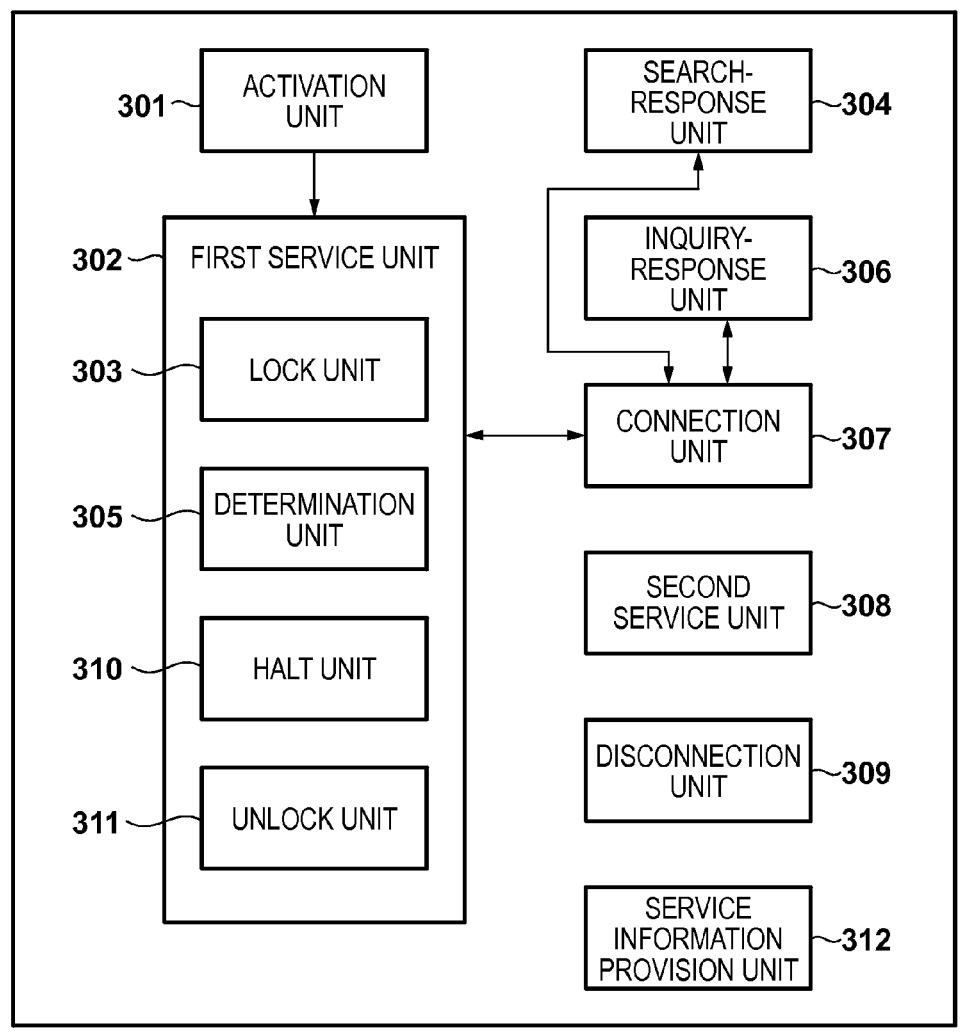
FIG. 3A is a block diagram of software in the printer according to the embodiment.
Figure 3B:
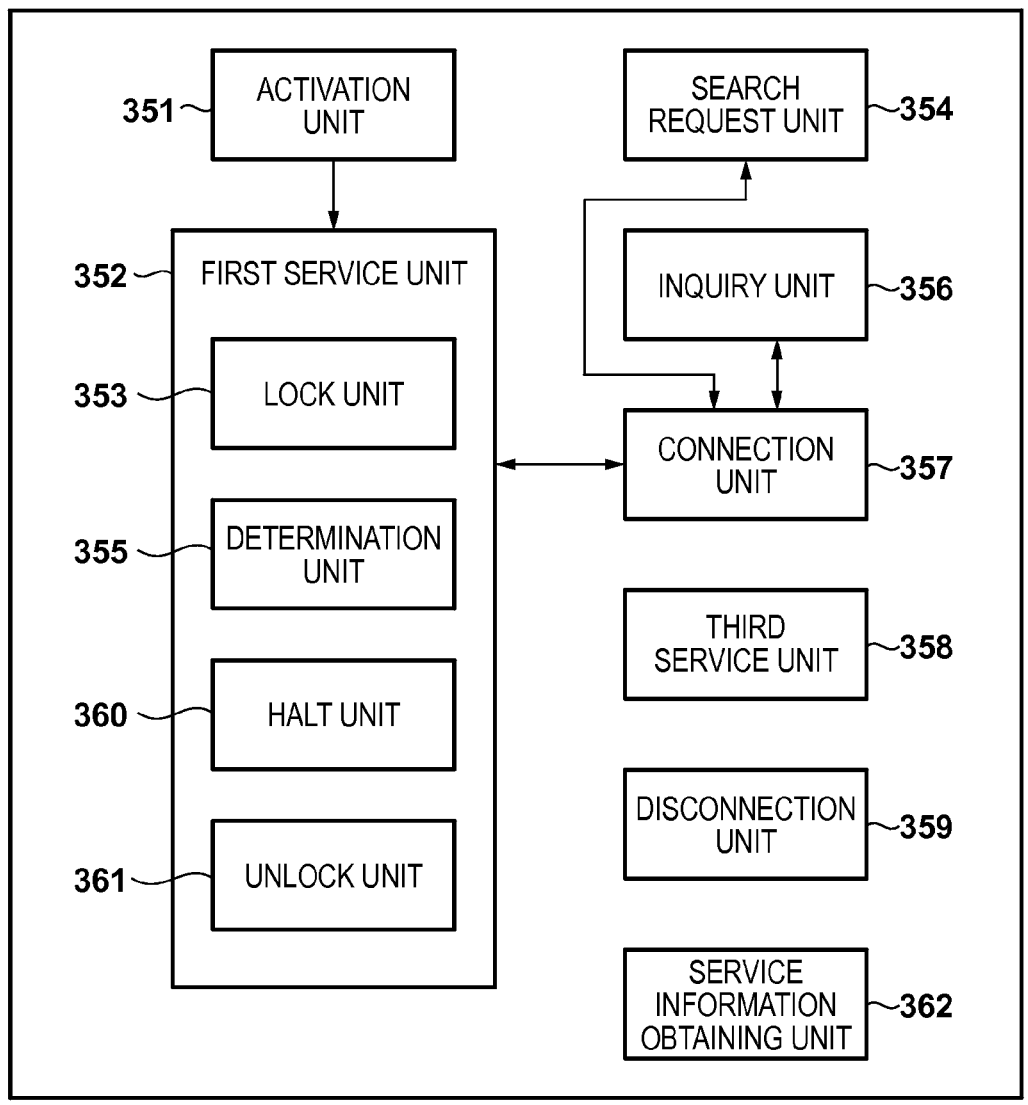
FIG. 3B is a block diagram of software in the cameras according to the embodiment.

FIGS. 3A and 3B show software modules realized by the CPUs of the control units 202 and 212 of the printer 101 and the cameras 102 and 103 reading out and executing programs stored in the memory units 201 and 211. Note that multiple software modules shown in FIG. 3 may be realized as a single software module, and a single software module shown in FIG. 3 may be realized as multiple software modules. Also, at least a portion of the software modules shown in FIG. 3 may be realized by hardware modules. Moreover, if a dedicated circuit is automatically generated in an FPGA from a program for realizing a software module by using a predetermined compiler, for example, a module realized by software can be realized by hardware, and the processing speed can be increased. Note that FPGA is an abbreviation for Field Programmable Gate Array. Also, a software module may be realized as a hardware module by forming a gate array circuit, similarly to an FPGA.

The following describes the software modules executed in the printer 101 with reference to FIG. 3A. An activation unit 301 activates a first service unit 302 in accordance with an operation instruction from the UI unit 203. The first service unit 302 performs communication with the cameras 102 and 103 via the communication unit 204, and executes a first service. The first service is a service by which, using a second service provided by a second service unit for example, image data is wirelessly transmitted from a camera to the printer, and the printer receives the image data and performs printing based thereon, and the first service is accompanied by port control that will be described later. Note that the second service is a specific service such as IPP (Internet Printing Protocol), PictBridge (standard set by the Camera & Imaging Products Association), or DLNA (registered trademark). In order to perform the later-described port control, the first service unit 302 includes a lock unit 303, a determination unit 305, a halt unit 310, and an unlock unit 311. The lock unit 303 locks TCP-defined ports that can be exclusively used for communication between the communication unit 204 of the printer 101 and other communication apparatuses (e.g., ports other than well-known ports). The determination unit 305 determines whether or not another communication apparatus, such as the camera 102 or 103, which has requested to perform connection processing with the printer 101, can provide the first service. The halt unit 310 halts the first service unit 302 if the camera that is the other communication apparatus does not provide the first service. The unlock unit 311 opens ports by, depending on the situation, unlocking ports locked by the lock unit 303.

A search-response unit 304 makes a response to a device search request from another communication apparatus in the vicinity of the printer 101. An inquiry-response unit 306 makes a response to a detailed inquiry regarding services provided by the printer 101 from another communication apparatus (the camera 102 or 103 in this example). A connection unit 307 performs wireless connection processing for establishing a wireless connection with another communication apparatus in accordance with a predetermined connection procedure. In the present embodiment, the connection unit 307 executes wireless connection processing in accordance with the connection procedure defined by the Wi-Fi Direct standard.

The second service unit 308 executes predetermined service processing in coordination with another connected communication apparatus. A disconnection unit 309 performs disconnection processing for disconnecting the wireless connection with another communication apparatus after communication has ended. A service information provision unit 312 provides information regarding a service compliant with UPnP or mDNS (in this example, the service provided by the second service unit 308), and makes responses to inquiries. UPnP is an abbreviation for Universal Plug and Play. Also, mDNS is an abbreviation for multicast DNS (Domain Name System).

Note that in the present embodiment, the first service unit 302 is a platform that operates in a higher layer than the layer in which the connection unit 307 established the wireless connection. Specifically, the communication performed by the first service unit 302 is performed using the wireless connection established by the connection unit 307. Also, communication may be performed using another service function unit in a higher layer than the first service unit 302. Furthermore, the layer in which the first service unit 302 operates and the layer in which the connection unit 307 established a wireless connection may be the same layer.

Next, the software modules executed in the cameras 102 and 103, which are the other communication apparatuses, will be described with reference to FIG. 3B. An activation unit 351 activates a first service unit 352 in the camera. The first service unit 352 performs communication with the printer 101 via the communication unit 214. The first service unit 352 includes a determination unit 355, a halt unit 360, and an unlock unit 361. The determination unit 355 determines whether or not the printer 101, which is the communication destination, can provide the first service. The halt unit 360 halts the first service unit 352 if the printer 101, which is the communication apparatus that is the communication destination, does not provide the first service. The unlock unit 361 opens ports by, depending on the situation, unlocking ports locked by a lock unit 353. In the present embodiment, the camera 102 is an apparatus that can provide the first service, and the camera 103 is an apparatus that does not provide the first service. Accordingly, the camera 103 does not include the first service unit 352.

A search request unit 354 transmits a device search request, for example, in order to establish a wireless connection (in the present embodiment, a WiFi Direct connection) with a communication apparatus in the vicinity. An inquiry unit 356 makes a detailed inquiry regarding services provided by the printer 101, from the camera 102 or 103, which is the other communication apparatus, to the printer 101. A connection unit 357 performs wireless connection processing for establishing a wireless connection with the printer 101, which is a communication apparatus, in accordance with a predetermined connection procedure. In the present embodiment, the connection unit 357 executes wireless connection processing in accordance with the connection procedure defined by the Wi-Fi Direct standard. A third service unit 358 executes predetermined service processing in coordination with other connected communication apparatuses. For example, in the present embodiment, the third service unit 358 executes a service for causing the printer 101 to print image data stored in a camera using the service provided by the second service unit 308 of the printer 101. A disconnection unit 359 performs disconnection processing for disconnecting the wireless connection with the printer 101, which is a communication apparatus, after communication has ended. A service information obtaining unit 362 obtains information regarding services compliant with UPnP or mDNS.

Figure 4A:
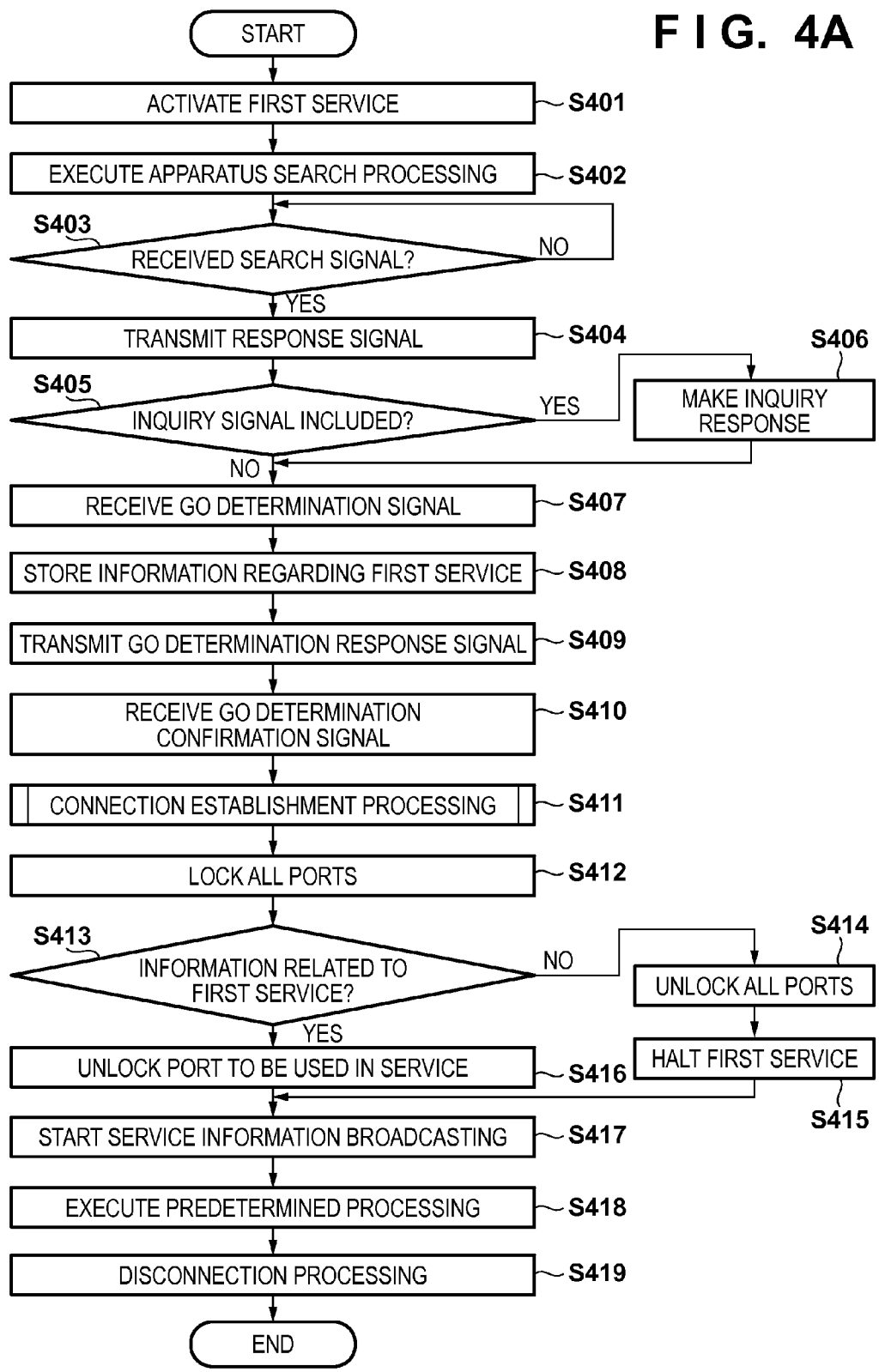
FIG. 4A is a flowchart of processing performed by the printer according to the embodiment.

The following describes operations performed by the printer 101, the camera 102, and the camera 103 of the present embodiment, which have the above-described configurations, with reference to the flowcharts shown in FIGS. 4A and 4B. In the printer 101, a program corresponding to the flowchart shown in FIG. 4A is stored in the memory unit 201. Due to this program being read out and executed by the CPU of the control unit 202, the printer 101 establishes a connection with the camera 102 or the camera 103 by direct communication, and data received from the camera is output by the print unit 207 of the printer 101. Similarly, in the cameras 102 and 103, a program corresponding to the flowchart shown in FIG. 4B is stored in the memory unit 211. Due to this program being read out and executed by the CPU in the control unit 212, the camera 102 or the camera 103 establishes a connection with the printer 101 by direct communication, and image data that is to be output by printing by the printer 101 is transmitted to the printer 101. Note that operations related to the first service unit 352 are not executed by the camera 103 due to not having the first service unit 352. Operations in the case of a connection between the printer 101 and the camera 102 will be described below.

In step S401, the activation unit 301 of the printer 101 activates the first service unit 302 in accordance with an operation made on the UI unit 203 by a user. This operation is an operation for instructing the establishment of a connection, for example. When the establishment of a connection is instructed, in step S402, the control unit 202 starts apparatus search processing performed by the search-response unit 304 in order to determine the camera with which a wireless connection is to be established. Meanwhile, in the camera 102, in step S451, the activation unit 351 activates the first service unit 352 in accordance with an operation made on the UI unit 213, and in step S452, the search request unit 354 broadcasts a search signal. In this way, the camera 102 transmits a search signal for making an apparatus search request, and a connection destination apparatus can be found when the printer 101 makes a response to the search signal. The search signal referred to here is a probe request defined in the IEEE 802.11 series, for example.

In step S403, the search-response unit 304 determines whether or not the search signal from the camera 102 was received, and in the case of determining that the search signal was received, a response signal is transmitted in step S404 in response to the search signal. The response signal referred to here is a probe response defined in the IEEE 802.11 series, for example. In step S453, the cameras 102 and 103 wait to receive a response signal in response to the search signal broadcasted by the search request unit 354. If a response signal is received, the processing from step S454 onward, which is for the establishment of a wireless connection by the connection unit 357, is started.

Note that a configuration is possible in which at the stage at which a response signal is received from the printer 101, the camera 102 transmits a signal (inquiry signal) for inquiring about details of the service provided by the printer 101, and obtains service information. The inquiry-response unit 306 of the printer 101 receives the signal (inquiry signal) inquiring about details of the service provided by the printer 101 (step S405), and transmits a response signal for notifying service information regarding all of the services provided by the printer 101 (step S406).

The inquiry signal referred to here is a service discovery query (hereinafter, "SD query") defined by the Wi-Fi Direct standard, for example. Also, the response signal is a service discovery response (hereinafter, "SD response") defined by the Wi-Fi Direct standard, for example, and includes service information regarding all of the services provided by the printer 101. Also, examples of the services provided by the printer 101 indicated by the service information include IPP, PictBridge, DLNA (registered trademark), various types of print services, and the like. These services are provided by the second service unit 308, and are called second services.

Subsequently, the connection unit 307 of the printer 101 and the connection unit 357 of the camera 102 perform connection processing in accordance with a predetermined connection procedure defined by the Wi-Fi Direct standard, for example. First, the connection unit 307 and the connection unit 357 determine which out of the printer 101 and the camera 102 is to operate as the wireless LAN access point (base station), and which is to operate as the wireless LAN client (terminal).

In the Wi-Fi Direct standard, the apparatus that operates as the wireless LAN access point is called the group owner (hereinafter, "GO"), and the apparatus that operates the wireless LAN client is called the client (hereinafter, "CL").

In step S454, the connection unit 357 of the camera 102 transmits a GO negotiation request as a GO determination signal for determining the printer 101 as the GO. In this case, the camera 102, which is the apparatus that transmits the GO determination signal, can provide the first service, and transmits information regarding the first service in the GO determination signal. On the other hand, an apparatus that does not provide the first service transmits the GO determination signal without information indicating that the first service can be provided. Note that as an alternative, an apparatus that does not provide the first service may transmit information indicating that the first service is not provided in the GO determination signal.

In step S407, the connection unit 307 of the printer 101 receives the above-described GO determination signal. In step S408, the determination unit 305 of the first service unit 302 stores information indicating whether or not the first service can be provided in association with the transmission source apparatus in the memory unit 201, in accordance with whether or not the received GO determination signal includes information regarding the first service. FIG. 5A shows a table of information stored in the memory unit 201.

Next, in step S409, the connection unit 307 of the printer 101 transmits a GO determination response signal (GO negotiation response) for determining the GO in response to the received GO determination signal. Here, the first service unit 302 includes information indicating that the printer 101 can provide the first service in the GO determination response signal. Accordingly, the GO determination response signal transmitted by the connection unit 307 includes information indicating whether or not the first service can be provided. In the camera 102 that can provide the first service, in step S455, the connection unit 357 receives the GO determination response signal, and in step S456, the first service unit 352 determines whether or not the first service can be provided based on the GO determination response signal that was received. The determination result is then stored in the memory unit 211.

Also, upon receiving the GO determination response signal from the printer 101, in step S457, the camera 102 determines whether the camera 102 or the printer 101 is to be the GO, and transmits the result to the printer 101 as a GO determination confirmation signal. The connection unit 357 sets itself as the GO or the CL in accordance with this determination, and then starts the connection processing of step S458. Here, the GO determination confirmation signal is a GO negotiation confirm signal, for example. The connection unit 307 of the printer 101 receives the GO determination confirmation signal in step S410, sets itself as the GO or the CL in accordance with the signal, and then starts the connection processing of step S411.

Connection establishment processing (step S411 and step S458) executed between the printer 101 and the camera 102 will be described below with reference to FIG. 6. In the present embodiment, connection establishment processing is executed in accordance with a predetermined connection procedure defined by the Wi-Fi Direct standard, for example. Note that a program corresponding to this connection establishment procedure is also stored in the memory unit 201 and the memory units 211, and executed by the control units 202 and 212.

In the apparatus determined to be the GO, the procedure moves from step S601 to step S602. In step S602, the GO apparatus is set so as to operate as a registrar that provides communication parameters that are to be used in the wireless network that is to be created by the GO apparatus, and in step S603, the GO apparatus provides the communication partner apparatus with the communication parameters. The communication parameters that are to be used in the wireless network that is to be created by the GO apparatus include an SSID (network identifier), an encryption key, an encryption system, an authentication key, an authentication system, and a frequency channel. Note that the registrar is the apparatus that provides communication parameters defined by WPS (Wi-Fi Protected Setup). Then, in step S604, the GO apparatus receives a connection request signal from the communication partner apparatus. The connection request signal referred to here is an association request signal defined in the IEEE 802.11 series standard, for example. Then, in step S605, the GO apparatus operates as a DHCP server that provides IP addresses, and determines an IP address for the communication partner apparatus, and in step S606, provides the communication partner apparatus with the determined IP address.

Meanwhile, in the CL apparatus, the procedure moves from step S601 to step S607. In step S607, the CL apparatus is set so as to operate as an enrollee that obtains communication parameters from the GO operating as the registrar, and in step S608, receives communication parameters from the registrar. Then, in step S609, the CL apparatus transmits a connection request signal defined in the IEEE 802.11 series based on the obtained communication parameters, and connects to the wireless network created by the GO. Then, in step S610, the CL apparatus operates as a DHCP client that obtains an IP address, and obtains an IP address from the DHCP server in step S611.

Figure 6:
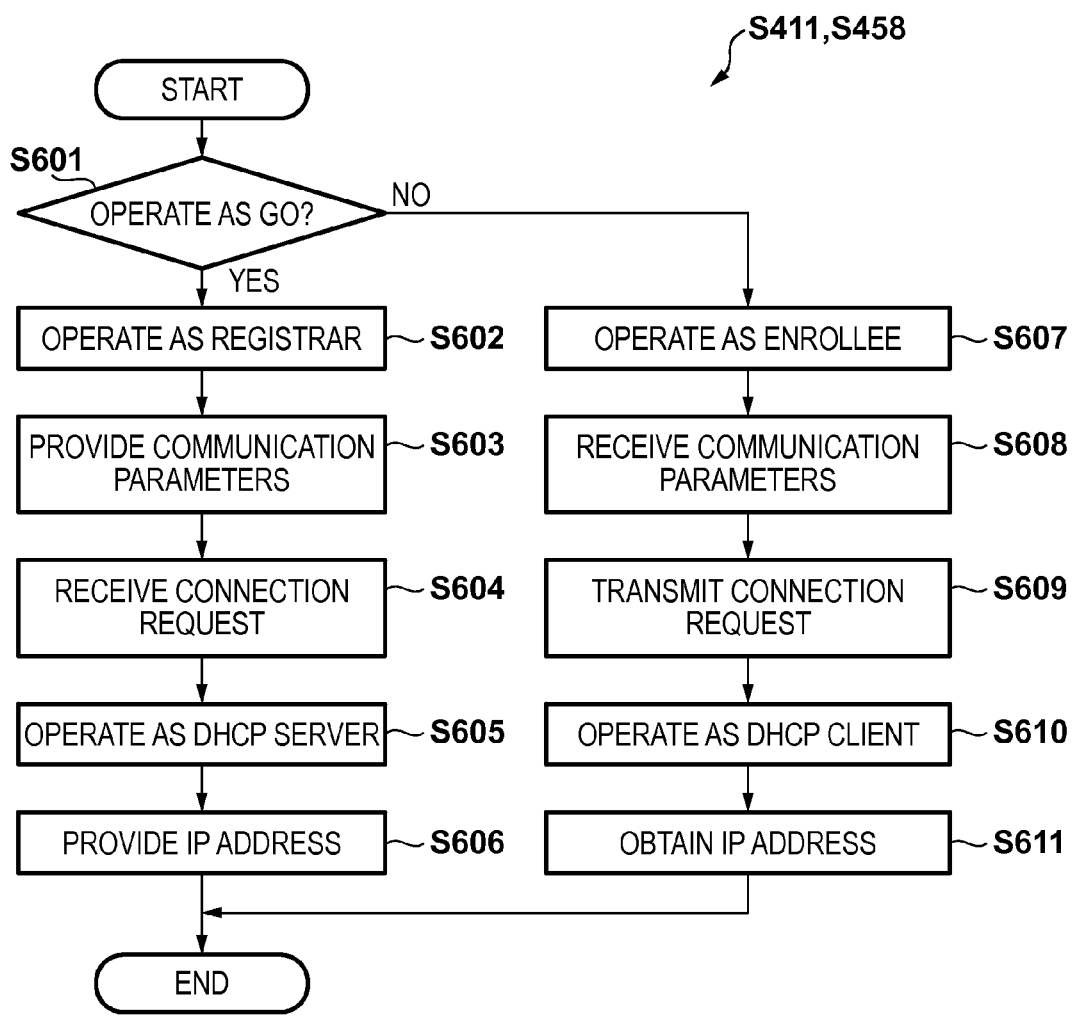
FIG. 6 is a flowchart of processing realized by the printer and the cameras.

Due to the connection unit 307 of the printer 101 and the connection unit 357 of the camera 102 executing the connection establishment processing shown in FIG. 6, a wireless connection is established by the printer 101 and the camera 102. When establishment of the wireless connection is complete, in step S412, the lock unit 303 locks all of the TCP-defined ports that can be exclusively used for communication between the communication unit 204 of the printer 101 and the camera that is the other communication apparatuses (e.g., ports other than well-known ports). TCP is an abbreviation for Transmission Control Protocol.

The lock states (locked or unlocked) of the ports are written to a table in the memory unit 201 by the connection unit 307. Specifically, the lock unit 303 stores, in the memory unit 201, port information in association with information indicating whether the corresponding port is in the locked state or unlocked state as shown in FIG. 5B. Note that although three ports are illustrated as representative examples in FIG. 5B, there is no limitation to this, and normally more ports are prepared. Locking ports in this way enables reducing the possibility of access by an unintended party. Accordingly, it is possible to reduce the possibility of the processing load borne by the printer 101 becoming unnecessarily large, and it is also possible to improve the level of security.

In step S413, the determination unit 305 determines whether or not the camera 102, which is the connected other communication apparatus, can provide the first service. This determination is made by the determination unit 305 reading out the information regarding the first service that is stored in the memory unit 201 in step S408. In this case, the connected camera 102 can provide the first service, and therefore the procedure moves to step S416. In step S416, port information is shared with the camera 102 by an inquiry and notification made regarding information on the port that is to be used in the service performed with the camera 102, and the unlock unit 311 unlocks the corresponding port based on the shared information. The unlock unit 311 changes the information that indicates the lock state of the locked port from the locked state to the unlocked state (open state) as shown in FIG. 5C, and stores this information in the memory unit 201. Note that the port that is to be used in the service here is illustrated as "xxx".

Note that the inquiry and notification made regarding the port information, which are made in order to share information on the port that is to be used in the service, are made by the first service units 302 and 352 using a specified port. Here, the specified port may be a port that has been determined in advance for the first service, or may be designated in the information regarding the first service that is stored in step S408.

Thereafter, in step S417, the service information provision unit 312 of the printer 101 notifies service information compliant with UPnP (Universal Plug and Play) or mDNS (multicast DNS), for example. Also, if a service inquiry compliant with UPnP or mDNS is made by the camera 102, the service information provision unit 312 makes a response to the inquiry.

In step S418, the second service unit 308 executes second service processing in coordination with the third service unit 358 of the connected camera 102. For example, the second service unit 308 receives image data from the camera 102, and performs print processing based on the received image data. Thereafter, when predetermined service processing is complete, in step S419, the disconnection unit 309 disconnects the connection with the camera 102, and completes this processing.

In the camera 102, when the connection establishment processing performed in step S458 ends, processing similar to steps S412 to S419 in FIG. 4A is executed in order to execute the previously described second service processing in coordination with the printer 101. Specifically, all of the ports that can be exclusively used for communication with the printer 101 are locked (step S412), and it is determined whether or not the printer 101 can provide the first service based on information stored in step S456 (step S413). If the printer 101 can provide the first service, the unlock unit 361 of the camera 102 opens a needed port for sharing with the printer 101 (step S416). The service information obtaining unit 362 then obtains service information compliant with UPnP or mDNS, for example, from the printer 101 (step S417). Through this processing, the camera 102 can find out that the printer 101 has started a predetermined second service, and use that service.

Next, the case where the user uses the camera 103 that does not provide the first service will be described. In the processing performed by the printer 101, the processing up to the establishment of a wireless connection between the camera 103 and the printer 101 and the locking of all ports (the processing through to step S412) is similar to the case of the connection with the camera 102. Note that the GO determination signal received from the camera 103 does not include information indicating that the first service can be provided, and information regarding the first service is not stored in the memory unit 201. In the camera 103, the processing related to the first service unit 352 in the flowchart in FIG. 4B is not executed.

In step S413, the determination unit 305 determines whether or not the connected camera can provide the first service. This determination is made by the determination unit 305 reading out information stored in the memory unit 201. Here, information regarding a predetermined first service is not stored, and therefore it is determined that the camera 103 selected by the user does not provided the first service, and the procedure moves to step S414.

In step S414, the unlock unit 311 unlocks all of the ports that were locked in step S412. Also, the unlock unit 311 changes the information that indicates the lock state of the locked ports from the locked state to the unlocked state (open state) as shown in FIG. 5D, and stores this information in the memory unit 201. Then, in step S415, the halt unit 310 halts the first service unit 302 that was activated in step S401.

In step S417, the service information provision unit 312 broadcasts service information compliant with UPnP or mDNS via a port that was unlocked in step S414. The camera 103 detects this broadcast information and makes an inquiry to the printer 101 for detailed service information, and thus becomes able to execute a predetermined service with the printer 101. In step S418, the second service unit 308 executes predetermined service processing in coordination with the connected camera 103. Thereafter, when the predetermined service processing is complete, in step S419, the disconnection unit 309 disconnects the connection with the camera 103, and completes this processing.

In this way, when connection processing is to be performed between one communication apparatus (e.g., a printer) and another communication apparatus (e.g., a camera), information indicating whether or not the other communication apparatus can execute a predetermined service can be received before the connection processing is performed. Then, the sharing of ports used in communication with the other communication apparatus is controlled based on the received information. Accordingly, the locking and unlocking of ports is controlled based on information indicating whether or not a predetermined service can be executed, which is obtained before connection processing, thus making it possible to raise the level of security while maintaining connectability. Also, the first service units 302 and 352 can be provided as applications. For this reason, even with a communication system that cannot use the service discovery function, it is possible to maintain connectability and security by installing and executing the first service units 302 and 352.

Note that although the one communication apparatus and the other communication apparatus are respectively described as being a printer and a camera in the above embodiment, there is no limitation to this, and the one communication apparatus may be a camera that has an imaging unit and can transmit image data obtained by the imaging unit to the printer, and the other communication apparatus may be the printer. Also, there is no limitation to the combination of a camera and a printer, and the present invention is applicable to any combination of smartphones, PCs, PDAs, storage devices, and the like.

Also, in the above embodiment, port locking is performed in accordance with the activation of the first service. This makes it possible to reduce the possibility of access by an unintended party. Accordingly, it is possible to reduce the possibility of the processing load borne by the printer 101 becoming unnecessarily large, and it is also possible to improve the level of security.

Also, communication apparatuses that can and cannot provide the first service can be distinguished from each other during the processing for determining the GO before performing connection processing. In the case of establishing a connection with an apparatus that does not provide the first service, the ports that were locked in accordance with the activation of the first service are unlocked, thus making it possible to maintain connectability.

As described above, according to the above embodiment, it is possible to raise the level of security while maintaining connectability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-102726, filed May 16, 2014, which is hereby incorporated by reference herein in its entirety.

What is claimed is:

1. A communication apparatus comprising:
   a storage device; and
   a processor configured to execute computer executable instructions recorded on the storage device, the computer executable instructions including instructions, that when executed by the processor, cause the communication apparatus to:
   perform wireless connection processing for performing wireless communication with another communication apparatus;
   specify a service that is to be executed along with the another communication apparatus, in the wireless connection processing, using wireless communication that is based on the wireless connection processing; and
   perform port control such that a port necessary for execution of the specified service is opened, and a port not necessary for execution of the specified service is locked,
   wherein the necessary port is unlocked after a plurality of ports that can be used for communication with the another communication apparatus are locked and without unlocking the plurality of ports aside from the necessary port, the plurality of ports being locked in response to a wireless connection between the communication apparatus and the another communication apparatus being established according to the wireless connection processing.

2. The communication apparatus according to claim 1, wherein the communication apparatus is caused to perform direct communication not passing through an access point when performing the wireless communication with the another communication apparatus.

3. The communication apparatus according to claim 1, wherein if a service cannot be specified, the communication apparatus is caused to open a plurality of ports that can be exclusively used for communication with the another communication apparatus.

4. The communication apparatus according to claim 1, wherein the computer executable instructions further include instructions, that when executed by the processor, cause the communication apparatus to receive a determination signal for determining which out of the communication apparatus and the another communication apparatus is to operate as a base station,
   wherein the service is specified based on whether or not the determination signal includes information relating to the service.

5. The communication apparatus according to claim 1, wherein the communication apparatus is caused to perform wireless connection processing with the another communication apparatus in accordance with a connection procedure that is compliant with Wi-Fi Direct.

6. The communication apparatus according to claim 1, wherein the communication apparatus includes a printer and is configured to print image data received from the another communication apparatus via the opened port.

7. The communication apparatus according to claim 1, wherein the communication apparatus includes a camera and is configured to transmit image data captured by an imaging device to the another communication apparatus via the opened port.

8. A method of controlling a communication apparatus, comprising:
   performing wireless connection processing for performing wireless communication with another communication apparatus;
   specifying a service that is to be executed along with the another communication apparatus, in the performed wireless connection processing, using wireless communication that is based on the wireless connection processing; and
   performing port control such that a port necessary for execution of the specified service is opened, and a port not necessary for execution of the specified service is locked,
   wherein the necessary port is unlocked after a plurality of ports that can be used for communication with the another communication apparatus are locked and without unlocking the plurality of ports aside from the necessary port, the plurality of ports being locked in response to a wireless connection between the communication apparatus and the another communication apparatus being established according to the wireless connection processing.

9. A non-transitory computer readable storage medium storing a program for causing a computer to execute a method of controlling a communication apparatus, the method comprising:

performing wireless connection processing for performing wireless communication with another communication apparatus;

specifying a service that is to be executed along with the another communication apparatus, in the performed wireless connection processing, using wireless communication that is based on the wireless connection processing; and performing port control such that a port necessary for execution of the specified service is opened, and a port not necessary for execution of the specified service is locked, wherein the necessary port is unlocked after a plurality of ports that can be used for communication with the another communication apparatus are locked and without unlocking the plurality of ports aside from the necessary port, the plurality of ports being locked in response to a wireless connection between the communication apparatus and the another communication apparatus being established according to the wireless connection processing.

* * * * *